No. 764,639. PATENTED JULY 12, 1904.
G. H. SHERMAN.
VEHICLE TIRE.
APPLICATION FILED MAY 13, 1903.
NO MODEL.
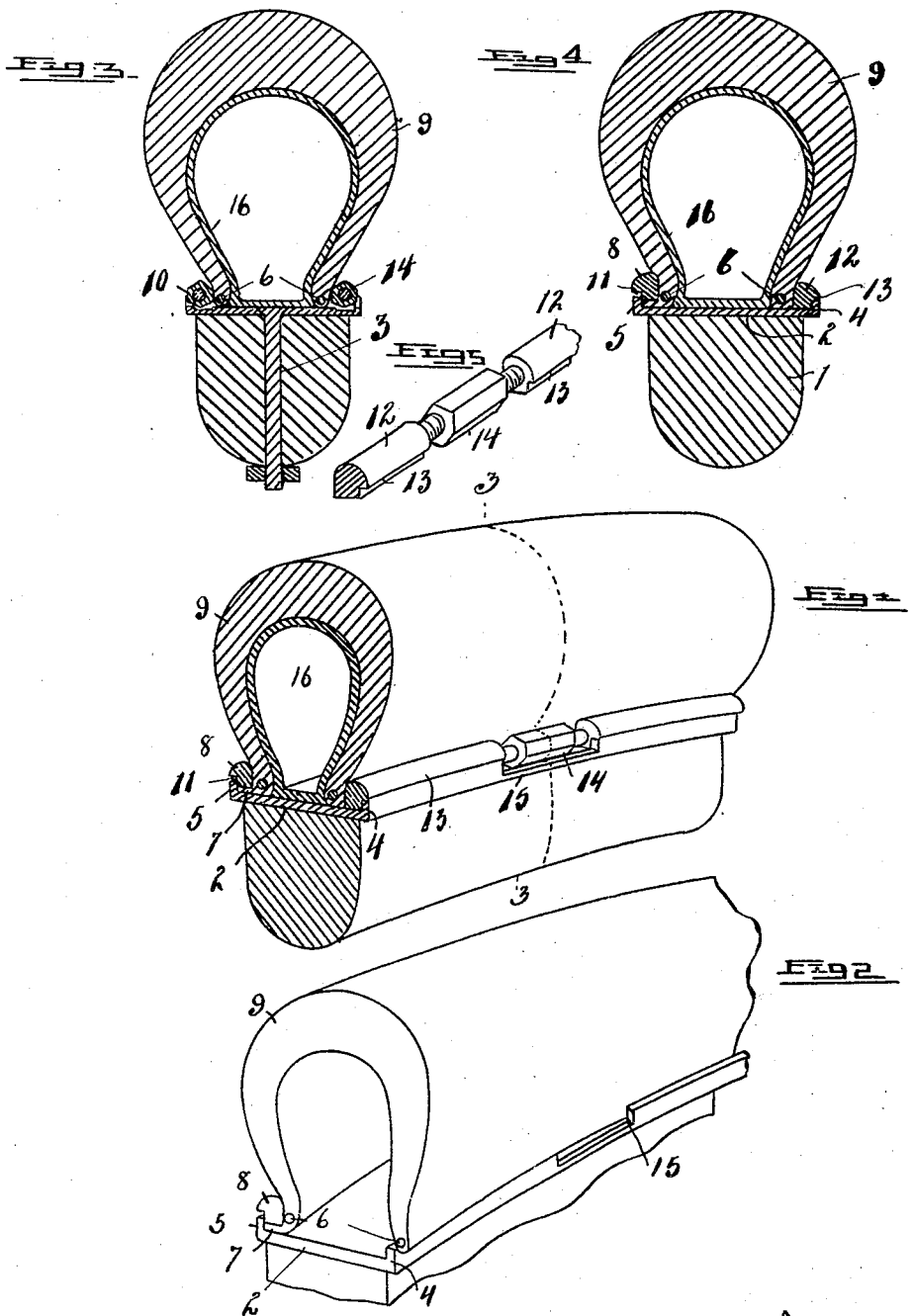
Witnesses
P. A. Hall.
E. D. Wright.
Inventor
George H. Sherman
By C. S. Wheeler & Co
Attorneys No. 764,639. Patented July 12, 1904.

UNITED STATES PATENT OFFICE.

GEORGE H. SHERMAN, OF DETROIT, MICHIGAN.

VEHICLE-TIRE.

SPECIFICATION forming part of Letters Patent No. 764,639, dated July 12, 1904.

Application filed May 13, 1903. Serial No. 156,924. (No model.)

*To all whom it may concern:*

Be it known that I, GEORGE H. SHERMAN, a citizen of the United States, residing at Detroit, in the county of Wayne, State of Michigan, have invented certain new and useful Improvements in Vehicle-Tires; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to pneumatic or inflatable rubber tires, and embodies a union of three essential features in the one unitary structure—to wit, first, the feature in a tire having non-stretching inner margins of the ready and easy application of the tire proper to and its removal from the metallic seat by a lateral or sidewise shifting of the tire proper in a plane substantially coincident with the plane of the face of the retaining-seat and without and as distinguished from working or placing a portion or part of the inner circumference of the tire proper into an annular depression or groove in the tire-seat while the remaining portion of such inner circumference is being sprung over a flange at the edge of the seat high enough to retain the tire proper after it is finally adjusted to the seat, an old and objectionable way; secondly, the feature of non-stretching in the tire proper, or essentially that part within and near to its retaining-seat, in a circumferential direction when subjected to the pressure due to inflation, and, thirdly, the feature of non creeping or traveling of the tire in a circumferential direction in its retaining-seat. I conceive myself the first to invent and produce a "pneumatic rubber tire" (and by this term I include the rubber portion or tire proper and the metallic portions constituting the retaining-seat and the antistretching devices) wherein these three features are incorporated and wherein the construction is such that these three features are made possible and carried into effect. The first of these features is carried into effect by constructing the tire-seat of a flat plate having its edges, one or both of them, turned outwardly to form flanges of low or short depth combined with a contractible and expansible annular retaining-band adapted to be carried by such seat proper and to act to build up and increase the depth of the outwardly-turned edge of the seat, there being such an annular band for the one or more outwardly-turned edges, as the case may be, such annular bands, or one of them, if more than one is used, being removable for the application and removal of the tire proper to and from its seat, such removal of the band being necessitated by the non-stretchable feature of the tire proper. The second of these features is carried into effect by an endless wire or ring, say, of metal embedded in or near the margins forming the inner circumference of the tire proper, and which second feature, besides being made possible by the presence of the first-named feature, also coöperates therewith by preventing the tire proper from stretching over the said annular band or bands, and the third feature is carried into effect by a portion of the tire proper being made to extend between the seat proper and the adjacent annular band, which grips such projecting part and prevents circumferential creeping of the tire proper in the seat, thus coöperating with the first feature, while being made more efficient by the presence of the non-stretching ring or wire of the second feature, which by adding rigidity to the base of the tire proper enables the non-creeping feature to act with greater effect upon the whole tire.

An incidental further object of my invention is to provide a simple and efficient means for allowing the inner tube in cases where a double-tube tire is used in connection with my improvements to be readily removed for purposes of repair and easily and quickly returned within the outer casing, which is accomplished by reason of one side or edge of my tire proper being permanently retained in its seat, while the opposite edge is removable through the first feature of my invention, which removability of such edge allows of the withdrawal or insertion of the inner tube.

In the accompanying drawings, forming a part of this specification, on which like reference-figures indicate corresponding parts, Figure 1 is a perspective view of a section of a pneumatic rubber tire mounted upon a portion of the rim of a wheel and illustrating the application of my invention. Fig. 2 is a similar view showing one edge of the outer casing released from the tire-seat or rim and the inner tube removed. Fig. 3 is a transverse section through the tire and tire-seat or rim as on line 3 3 of Fig. 1. Fig. 4 is a diametrical section through the tire and tire-seat or rim. Fig. 5 is a fragmentary view in perspective of the meeting ends of one of the contractible bands which secure the margins of the outer casing within the tire-seat or rim, showing the tapped sleeve which receives the threaded ends of said band.

Referring to the characters of reference, 1 designates the felly of the wheel, upon which is mounted the metal tire-seat or rim 2, secured in place by the bolts 3, which pass through said seat or rim. The margins of the seat or rim 2 are turned outwardly to form straight diametrical flanges 4 and 5, which stand or extend a short distance above the plane of the flat face of the rim.

The outer casing 9 of the tire is substantially U-shaped in cross-section, and embedded in the margins of said casing and extending circumferentially thereof are the inextensible metallic strands 6, of which it is preferred to employ one for each margin, which strengthen and stiffen the margins of said casing and give it the second feature of my invention--to wit, the non-stretchable quality in the base portion of the tire. Formed integral with one of the margins of the casing or permanently or suitably attached thereto is a laterally-extending flap 7, adapted to lie upon the face of the tire-seat or rim 2 and preferably abut against the flange 5. For the purpose of aiding in securing the tire firmly in the rim and at the same time preventing the possibility of its creeping a contractible band 8 is employed, adapted to lie or extend between the flange 5 and the side of said casing upon the marginal flap 7. The ends of this band are provided with a right and left thread, respectively, and enter a sleeve 10, which is correspondingly tapped. The exterior of said sleeve is made hexagonal to allow of the application of a wrench or spanner, so as to enable said band by the turning of said sleeve to be contracted, and thereby forcibly compress the flap 7 of the casing between its under edge and the face of the rim. This or some other means for contracting them may be employed. In the side of the band is formed an annular channel 11, which receives the corner of the flange 5, whereby said band is held against outward displacement and whereby also the band the more perfectly constitutes a portion of the two-part flange thus built up. The opposite margin of the casing is confined by a similar contractible band 12, which lies upon the face of the tire-seat or rim between the marginal flange 4 and the side of said casing and is provided in the side thereof with a channel 13, which receives the corner of said flange 4, whereby it is securely retained in place, and the margin of the tire upon that side is firmly held within the tire-seat or rim. This band 12, like the band 8, is also made contractible by providing its ends with a right and left thread, respectively, which screw into a correspondingly-tapped sleeve 14, having a hexagonal circumference to facilitate the turning of said sleeve for the purpose of expanding and contracting said band, as will be well understood. This is a preferred means of uniting the ends of the band. Thus it will be seen that the flanges 4 and 5 being of small depth, but of little greater diameter on their periphery than the diameter of the strands or rings 6 along the inner margins of the latter, the tire proper may be readily placed in the channel or tire-seat by simply placing one portion of one edge or margin of the inner periphery of the tire in the seat, and then the remaining portion of the same margin, and then likewise a portion of the other margin, and finally the remaining portion of the latter margin, the tire proper being essentially manipulated in the plane of the surface of the tire-seat. Thus the tire can be quickly placed upon or removed from its seat, and as it is preferred that both of the flanges 4 and 5 shall be low this manipulation may be performed from either side of the wheel. In placing large numbers of these tires upon wheels in the conduct of business and the equipping of vehicles, such as automobiles, with these tires this facility of application is of first importance. It will also be noted that once the tire is in place in the seat the application of the contractible band or bands will maintain it against lateral dislodgment, as these bands act to build up and increase the depth of the fixed flanges 4 and 5, this building up giving the flanges the requisite depth while in use, but enabling this depth to be in effect cut down during the application or removal of the tire to or from the seat, as stated.

One of the great difficulties experienced in double-tube tires is in removing the inner tube for the purpose of repairing in case of a puncture. By means of the arrangement herein shown the tire may be readily removed from the tire-seat or rim after deflating by expanding the band 13 through the turning of the sleeve 14 until it has been sufficiently increased in diameter to enable it to be slipped over the flange 4. It will be noted that said flange 4 is cut away at the point where the sleeve 14 is located, as shown at 15. By means of a suitable tool, which may be placed under the margin of the casing or tire at this point, said margin may be sprung outwardly over the flange 4, as shown in Fig. 2, when it may be readily freed from the tire-seat or rim, enabling an easy access to the exterior thereof for the purpose of removing the inner tube 16 in cases where such type of tire is used in connection with the remaining features of my invention. After the repairs have been made upon the inner tube it is replaced within the casing and the margin of the casing set back into the rim, when the band 13 is placed in position and contracted, so as to firmly hold the casing in place, as shown in Fig. 1. It will be noted that when one margin of the casing has been released, as above described, the opposite margin, having the flap 7, is still securely fastened in the tire-seat or rim by the band 8, so that its position does not change, obviating the necessity of removing but one of the contractible bands for the purpose of withdrawing the inner tube. It will also be noted that the pressure exerted upon the flap 7 by the contracting force of the band 8 will effectually prevent the creeping of the tire in the rim. This non-creeping of the tire proper in the seat is of great importance in preventing the tearing of the valve-stem from the tire and in preventing the undue wear on the bottom of the tire and on the sides against the bottom and sides of the tire-seat, while the non-stretching of the tire proper circumferentially prevents the possibility of its dislodgment from the seat and while the non-stretching also assists in effecting non-creeping, because the non-stretching gives the tire greater rigidity in the neighborhood of its base within the seat, whereby the gripping effect of the contractible band 8 is rendered more effective in preventing creeping. Moreover, a stretching action of the tire in a longitudinal direction in the neighborhood of the gripping action of the band would tend to lessen such gripping action or to overcome it. Thus the interdependence of the several features of my tire will be manifest, while the facility with which each is brought into practical effect is likewise apparent. It should be added, too, that inasmuch as the non-creeping feature is dependent upon one of the contractible bands in the construction illustrated the other band need not be removable, though that form of construction is preferred. It is also preferred that there should be a plurality of the non-stretching bands, yet one of these bands— say at the side opposite to that where the non-creeping gripping is applied—might be used alone.

Having thus fully described my invention, what I claim as new, and desire to secure by Letters Patent, is—

1. In an inflatable rubber tire, the combination, with the tire proper, non-stretchable in its base portion to prevent elongation in a circumferential direction, of a tire-seat essentially flat and having a suitable flange at one edge, and a two-part flange at the other, one part being fixed and narrow of diameter, and the other complementary part relatively wide of diameter removable and contractible, and the contractible portion in gripping contact with a portion of the tire proper to effect non-creeping.

2. In a pneumatic rubber tire, the combination, with a tire proper having non-stretchable wire bands in its base portion, of a tire-seat essentially flat and having at one side a suitable flange, and a two-part flange at the other, one part being fixed and narrow, and the other removable and contractible, and a lateral flap extending from the tire proper between the seat and said contractible part of the flange.

3. In a pneumatic rubber tire, the combination with the tire proper, non-stretchable in its base portion to prevent elongation in a circumferential direction, of a tire-seat essentially flat and having at each edge a flange, each two-part flange being composed of a fixed relatively narrow portion sustained by said fixed portion and a relatively wide complementary removable contractible portion.

4. In a pneumatic rubber tire, the combination with a tire proper, non-stretchable in its base portion to prevent elongation in a circumferential direction, of a tire-seat having a two-part flange at each side, one a fixed part and the other a complementary removable contractible part sustained by said fixed part, and a portion of the tire proper extended between the tire-seat and one of the contractible bands, to be gripped thereby, to prevent creeping.

5. In a rubber tire, the combination, with a tire-seat essentially flat and having a relatively narrow fixed flange at each edge, of a relatively wide removable contractible band for and coacting with each flange to constitute the complete flange at each side.

6. In a rubber tire, the combination, with a tire-seat essentially flat and having a narrow fixed flange at each edge, of a removable contractible band for each flange to constitute the flange at each side, each band being rabbeted along its edge to receive its respective narrow flange.

7. In a pneumatic rubber tire, the combination with the tire proper having a lateral flap, of a tire-seat having a two-part flange composed of a fixed part relatively narrow of diameter, and a complementary removable contractible ring-like part, said fixed part and ring-like part coacting to form the complete flange, the latter being adapted to bind against said flap.

8. In a pneumatic rubber tire, the combination with a tire proper having a lateral flap and a non-stretchable wire embedded in the inner portion, of a tire-seat having a two-part flange, one fixed and narrow and the other removable and contractible, the latter and the non-stretchable wire acting to give the tire the qualities of non-creeping and non-stretching.

9. In an inflatable tire for vehicle-wheels, the combination of the outer casing and the inner tube, the rim having a short diametrical flange at each edge thereof, the outer casing having inextensible strands embedded in each of its margins, one of said margins having a lateral flap adapted to lie upon the surface of the rim, a contractible band adapted to bind said flap upon the rim between the outer flange and the side of the casing, and a contractible band adapted to secure the opposite side of the casing and to lie between said casing and said diametrical flange.

10. In an inflatable vehicle-tire, the combination with the outer casing and the inner tube, of a rim having at each edge a short diametrical flange, the outer casing having an inextensible strand in each margin thereof, and one of the margins of said casing having also a projecting flap adapted to lie upon the surface of the rim, a contractible band adapted to bind said flap to the rim between the side of the casing and said flange, a contractible band adapted to lie within the flange of the rim at the opposite side and retain the casing in place, said band being threaded at its terminals, and a tapped sleeve which receives said threaded ends, the flange of the rim at the point where said sleeve unites said band, being cut away to allow of a free rotation of said sleeve.

11. In an inflatable tire for vehicle-wheels, the combination of the outer casing and the inner tube, the rim having retaining members, the outer casing having inextensible strands embedded in each of its margins, one of said margins having a lateral flap adapted to lie upon the surface of the rim, and a contractible band adapted to bind said flap upon the rim between the outer flange and the side of the casing.

In testimony whereof I sign this specification in the presence of two witnesses.

GEORGE H. SHERMAN.

Witnesses:
E. S. WHEELER,
P. A. HALL.